Oct. 4, 1955     J. E. STANWORTH     2,719,932
SOFT GLASS ULTRAVIOLET DISCHARGE LAMP
Filed March 14, 1949
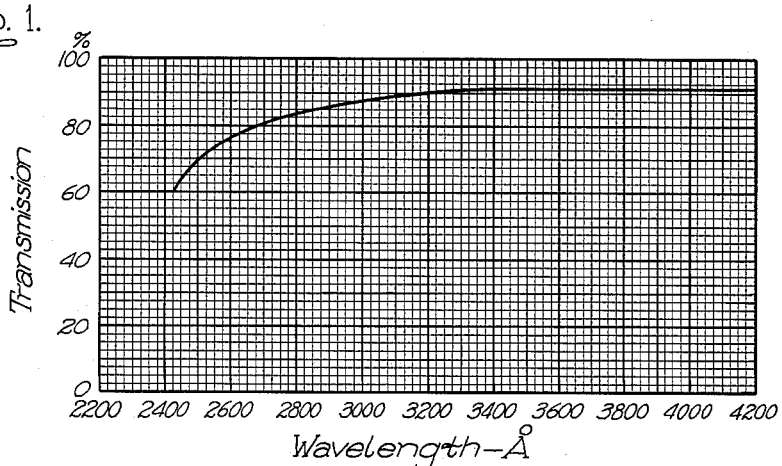
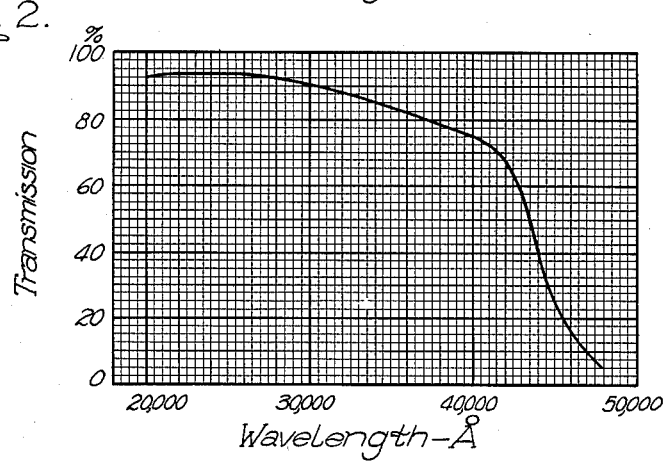
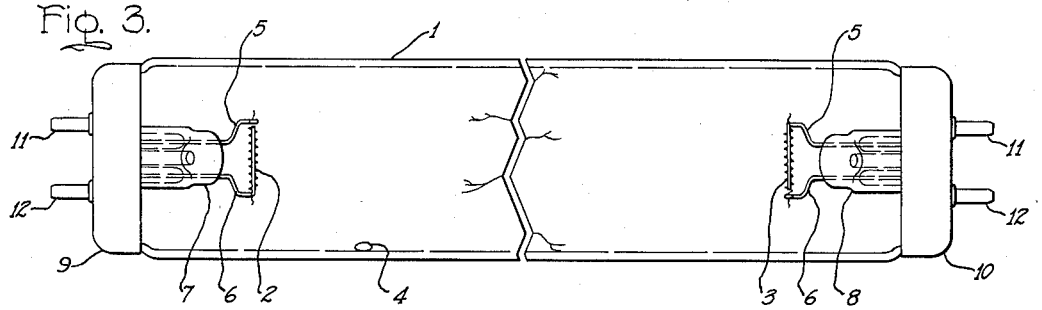
Inventor:
John Edwin Stanworth,
by Otto Lichy
His Attorney.

United States Patent Office 2,719,932
Patented Oct. 4, 1955

2,719,932
SOFT GLASS ULTRAVIOLET DISCHARGE LAMP

John Edwin Stanworth, Sheffield, England, assignor to General Electric Company, a corporation of New York Application March 14, 1949, Serial No. 81,324

Claims priority, application Great Britain January 15, 1947

10 Claims. (Cl. 313—112)

My invention relates to gaseous electric discharge lamps and more particularly to such lamps emitting ultraviolet radiations of 2537 Å. wave length.

Lamps of this type have been commercially available for upwards of ten years and are useful for destroying airborne bacteria to inhibit the spread of respiratory diseases in hospitals, barracks and general interiors, for example. As presently constituted, these lamps comprise a hard (low expansion, high softening point) glass envelope which transmits the radiations of 2337 Å. wave length and are available in 4, 8, 15 and 30 watt sizes. While the 8, 15 and 30 watt lamps are similar in structure to commercial fluorescent lamps of the same sizes, the latter type of lamp is considerably less expensive to make in spite of the fact that it has an additional element, the phosphor, not present in the ultraviolet lamp.

The difference in the cost of manufacture of the two types of lamps is due to the fact that an inexpensive soft (high expansion, low softening point) glass is used for the fluorescent lamp envelope whereas an expensive hard glass must be used for the envelope of the ultraviolet lamp because none of the available soft glasses have suitable transmission characteristics for the effective 2537 Å. wave length radiation. Not only is the hard glass itself more expensive but since it requires, in order to make a gas-tight seal, the use of tungsten leading-in wires rather than the inexpensive copper coated nickel-iron leading-in wires used for fluorescent lamps, its use entails additional expense in manufacture of the lamp.

The principal object of the invention is to provide a gaseous electric discharge lamp for emitting ultraviolet radiations of 2537 Å. wave length which is less expensive to manufacture than present lamps of this type. Another object of the invention is to provide such a lamp having a soft glass envelope portion with a transmission for 2537 Å. wave-length radiation in excess of about 40% in a thickness of 1 mm. A further object is to provide a soft glass envelope having a high transmission characteristic for 2537 Å. wave length radiation. A still further object of the invention is to provide a soft glass having a high transmission for 2537 Å. wave length and infrared radiation, that is, rays of wave length extending from below 2537 Å. to about 50,000 Å. Still further objects and advantages of the invention will appear from the following detailed description of species thereof and from the appended claims.

In the following description of species of the invention the production of a soft glass composition transparent to rays having wave lengths extending from the short ultraviolet to the long infrared wave lengths of the spectrum, that is to say, glasses transparent to rays of wave lengths extending from below 2537 Å. to about 50,000 Å. units, will first be described, together with Figs. 1 and 2 of the accompanying drawing showing graphically the transmission of a soft glass of my invention in the ultraviolet and infrared spectral regions. An ultraviolet emitting discharge lamp shown in a side elevational, fragmentary view in Fig. 3 of the drawing and having an envelope of my ultraviolet transmitting soft glass will then be described.

It is well-known that glasses to be transparent to ultraviolet rays should be as free as possible from iron and other impurities, and that iron, when present, should be in the form of ferrous oxide and not ferric oxide, if the maximum ultra-violet light transmission is desired. Steps have, therefore, been taken in the past in the production of glass compositions transparent to ultraviolet light to melt the batch under reducing conditions, or to incorporate into the batch a reducing agent capable of reducing the undesired ferric oxide to the less harmful ferrous oxide.

It has also been suggested to use, as an ingredient of the glass, aluminum, zinc or tin in the metallic form, it being introduced into the batch in the form of small particles so as to be intimately mixed into the batch.

Thus, it has been proposed to prepare a glass composition transparent to ultraviolet light by using substantially equal proportions of silica and borax and incorporating powdered aluminum into the batch. The theory was put forward that this avoided the production of gaseous oxides dissolved in the glass, the presence of such oxides being considered as leading to a gradual reduction of transparency to ultraviolet radiation under the action of such radiation. Also, by using silica and borax as the glass-forming constituents and avoiding the use of other alkali compounds, such as sodium and potassium carbonates in the batch, the formation of gaseous oxides was further avoided.

It is also generally considered that to obtain the best possible transmission in the infrared, any iron oxide present in the glass should be in the form of ferric oxide and that, therefore, it is impossible to obtain very high transmission in both ultraviolet and infrared if the glass contains iron oxide as impurity.

I have found, however, that glass transparent to both ultraviolet and infrared rays can be produced by incorporating a small proportion of aluminum metal into the batch used for making a soft glass containing substantial proportions of silica and alkali. A glass composition in accordance with the invention is constituted of silica (which may be in part replaced by boric oxide) and alkali and alkaline earth metal oxides, the batch materials from which the glass has been made being substantially free from impurities such as sulphur and being sufficiently free from iron such that the finished glass contains less than .015%, by weight, of iron oxide; aluminum being introduced into the batch in the form of metal powder in a proportion of from 0.5–5 parts, by weight, to 4500 parts, by weight, of silica. In this specification magnesium oxide is included in the group identified as alkaline earth metal oxides. In a modification, the powdered aluminum is replaced wholly or in part by powdered silicon which has been found to achieve the desired result. When the aluminum is to be replaced by silicon an equal weight of the latter should be used in replacement of the aluminum displaced.

It is important that the batch materials do not contain sulphur in any form (for example, sulphate, sulphide, or sulphite) and that the glass should not contain any substantial quantity of zinc oxide. Iodine as an impurity in the finished glass is also to be avoided.

The known precautions should be taken to prevent introduction of impurities into the finished glass, the raw materials and the container in which the melt is effected being such that the iron oxide content of the finished glass does not exceed the .015 percentage above-mentioned expressed as $Fe_2O_3$. For this reason it is necessary to select the constituents of the batch with great care. Thus, the alkali can be introduced into the batch in the form of potassium, sodium or lithium carbonates provided that the alkali used is sufficiently free from impurities.

Boric oxide may be introduced in partial replacement of silica in an amount up to 5%, by weight. In this case it serves its usual purpose as a flux, and does not affect the ultraviolet transmissibility of the finished glass. When $B_2O_3$ is included we have found that it is desirable to introduce it and a percentage of $Na_2O$ together in the form of borax since this generally available source of boron possesses the greatest degree of purity.

All the percentage of alkaline earth metal oxides may be in the form of BaO, attention being paid to the purity of the material employed in the batch. Barium carbonate is preferably employed as the batch material since it is available in a sufficient degree of purity; if available in sufficient purity, however, calcium carbonate may be employed as a source of CaO, partially replacing the BaO in the glass. BaO can also be replaced by MgO only if the source of MgO is sufficiently pure, but BaO has the advantage that it may be introduced in high proportions without involving de-vitrification and may thus lessen the amount of alkali to be employed without changing the thermal expansion coefficient of the glass from a value of approximately $9.5 \times 10^{-6}$ per ° C., which is a value to be sought.

I have mentioned above that zinc oxide is to be avoided and easily reducible oxides such as PbO should also be excluded. Strontia and alumina may be used in the batch when obtainable in sufficiently pure form.

A glass composition according to the invention preferably falls within the following range of composition by weight, viz., $SiO_2 + B_2O_3$ 60–74%; $B_2O_3$ up to 5%; $Na_2O + K_2O + Li_2O$ 13–20%; and $BaA + MgO + CaO$ 8–27%. A composition found particularly useful is one comprising $SiO_2$ 65%; $B_2O_3$ 2%; $Na_2O$ 5.5%; $K_2O$ 9.5% and BaO 18%. In a glass of this composition the amount of aluminum to be used is about 0.03% of the weight of the finished glass. This percentage may be varied somewhat according to (a) the grain size of the raw materials, particularly that of the sand; and (b) the conditions of melting, for example whether the batch is melted under slightly oxidizing or slightly reducing conditions. If melted under slightly oxidizing conditions a slightly higher percentage of aluminum is required. The function of the aluminum is primarily to insure that such iron oxide as is present in the final glass is in the ferrous form.

The transmission characteristics in the ultraviolet and infrared spectral regions of the glass in a thickness of 1 mm. are shown in Figs. 1 and 2, respectively, of the drawing in which the curve of Fig. 1 represents the transmission of a glass in the ultraviolet spectral range from about 2400 to 4200 Å. units and the curve of Fig. 2 represents the transmission of the glass in the infrared spectral range from about 20,000 to about 50,000 Å. units. As shown in Fig. 1, the glass represented thereby transmits approximately 74% of incident ultraviolet radiation of 2537 Å. wave length.

The above glass composition within the scope of the invention may be used for forming tubes and bulbs for electric incandescent and discharge lamps; it possesses the necessary physical characteristics suitable for the working to which glass intended for these purposes is subjected during the production of the finished articles. It melts readily in the flame, is not subject to devitrification during manufacture and use, will make satisfactory seals to metals, such as copper-coated nickel-iron, usually employed for lead-in conductors in incandescent and fluorescent lamps, and may be hermetically united with the lead glass stems now used for such lamps.

It thus falls within the class of glasses known in the incandescent and fluorescent lamp art as soft glasses, such as the lead and lime glasses, having softening temperatures of about 600° C. to about 700° C. and co-efficients of expansion of about 8.5 to about $10.2 \times 10^{-6}$ in a temperature range between about 20° C. to about 320° C. so as to make hermetic joints with the usual copper-coated nickel-iron leading-in wires. The glasses known in this art as hard glasses have softening temperatures higher than about 700° C. and coefficients of expansion such that they are capable of uniting with leading-in conductors of tungsten or molybdenum and making hermetic fused joints therewith. For example, two of the usual commercial lamp envelope hard glasses have softening temperatures of about 819° C. and 755° C. and coefficients of expansion of $3.3 \times 10^{-6}$ and $3.6 \times 10^{-6}$, respectively.

The envelope of the commercial lamps emitting 2537 Å. wavelength radiation consists of a hard glass which has a softening temperature of about 740° C. and a coefficient of expansion of about $3.8 \times 10^{-6}$ and makes a gastight fused joint with the tungsten lead-in wires of the lamps. This glass in a thickness of about 1 mm. transmits about 75 to 80% of the generated 2537 Å. wavelength radiation at the start of the operating life of the lamp and about 45 to 50% of such radiation after complete solarization or at the end of the first 500 hours of the useful operating life of the lamp. The new soft 2537 Å. wavelength radiation transmitting glass of this invention has about the same transmission characteristics while avoiding the disadvantages of higher fabricating costs of the hard glasses.

The lamp shown in Fig. 3 of the drawing comprises an elongated tubular envelope 1 of the ultraviolet transmitting soft glass disclosed above and is of the type disclosed in U. S. Patent 2,182,732 Meyer et al., issued December 5, 1939, and assigned to the assignee of the present application. The envelope 1 has two electrodes 2 and 3 sealed therein at the ends thereof and is filled with a starting gas, such as argon, at a pressure of approximately 2 to 4 mm. at room temperature. The envelope also contains mercury, indicated by the droplet 4, and the lamp is designed to operate under room temperature of the ambient at a mercury vapor pressure of about 10 microns and an envelope temperature of approximately 47° C. The low pressure mercury arc in the lamp produces ultraviolet radiation with very high efficiency about fifty percent of the wattage input to the lamp being converted into radiations of 2537 Å. wave length. As pointed out above, the soft glass of envelope 1 transmits a high percentage of the 2537 Å. wave length radiation so that the lamp produces an abundance of such radiation for use external thereto.

A pair of lead-in conductors 5 and 6 for each of the electrodes 2 and 3 pass through the glass stems 7 and 8 at the ends of the envelope 1 and are preferably of the usual structure including a length of copper-coated nickel-iron hermetically united with the glass of the stems 7 and 8. The stems 7 and 8 may consist of the same glass as the envelope 1 or of the lead glass usually employed for fluorescent lamp stems. The ultraviolet transmitting soft glass of this invention has a coefficient of expansion such that it may be hermetically united directly to such lead-in wires and to such stems.

The lamp is provided at its ends with the usual bases 9 and 10, each having thereon a pair of contact pins 11 and 12 electrically connected to the conductors 5 and 6, respectively.

This application is a continuation-in-part of my copending application Serial No. 794,825 filed December 30, 1947, and assigned to the assignee of the present application.

What I claim as new and desire to secure by Letters Patent of the United States is:

1. An ultraviolet electric discharge lamp comprising a sealed envelope containing mercury vapor at a pressure of the order of 10 microns whereby to generate a predominance of ultraviolet radiations of 2537 Å. wave length during operation and having a light transmitting portion consisting of a soft glass having a coefficient of expansion in the neighborhood of 8 to $10 \times 10^{-6}$ and a batch composition including material of the group consisting of aluminum powder and silicon powder and mixtures thereof whereby said glass in a thickness of 1 mm. has a transmission for radiations of 2537 Å. wave length in excess of about 40%.

2. A low pressure mercury vapor ultraviolet electric discharge lamp designed for operation at a mercury vapor pressure of the order of 10 microns whereby to generate a predominance of radiations of 2537 Å. wave length and having an envelope provided with lead-in conductors including a portion of copper-coated nickel-iron hermetically united with said envelope, said envelope consisting of soft glass having a coefficient of expansion in the neighborhood of 8 to $10 \times 10^{-6}$ and a batch composition including material of the group consisting of aluminum powder and silicon powder and mixtures thereof whereby said glass in a thickness of 1 mm. has a transmission for radiations of 2537 Å. wave length in excess of about 40%.

3. An ultraviolet electric discharge lamp comprising a sealed envelope containing mercury vapor at a pressure of the order of 10 microns whereby to generate a predominance of ultraviolet radiations of 2537 Å. wave length during operation and having a light transmitting portion consisting of a soft glass having as its principal ingredients silica and oxides of alkali and alkaline earth metals and having a coefficient of expansion in the neighborhood of 8 to $10 \times 10^{-6}$, said glass having a batch composition including material of the group consisting of aluminum powder and silicon powder and mixtures thereof whereby said glass in a thickness of 1 mm. has a transmission for radiations of 2537 Å. wave length in excess of about 40%.

4. A glass composition which is transparent to radiation of wavelengths extending from the short ultraviolet to the long infrared comprising a soft glass containing substantial proportions of silica and alkali, said glass having a batch composition including material of the group consisting of aluminum powder and silicon powder and mixtures thereof.

5. A glass composition constituted of silica (which may be replaced partially by boric oxide) and alkali and alkaline earth metal oxides, the batch materials from which the glass has been made being substantially free from sulphur and containing less than 0.015% by weight of iron oxide, said glass having a batch composition including material of the group consisting of aluminum metal powder and silicon powder and mixtures thereof in a proportion of from 0.5-5 parts by weight to 4500 parts by weight of silica.

6. A glass as claimed in claim 5, in which constituents are present in the following proportions by weight: $SiO_2 + B_2O_3$ 60–74%; $B_2O_3$ up to 5%; $Na_2O + K_2O + Li_2O$ 13–20%; $BaO + MgO + CaO$ 8–27%.

7. A glass composition constituted substantially of 65 per cent silica, 2 per cent boric oxide, 5.5 per cent sodium oxide, 9.5 per cent potassium oxide, 18 per cent barium oxide and having a batch composition including material of the group consisting of aluminum metal powder and silicon powder and mixtures thereof in a proportion of from 0.5 to 5 parts by weight to 4500 parts by weight of silica.

8. A glass composition constituted substantially of 65 per cent silica, 2 per cent boric oxide, 5.5 per cent sodium oxide, 9.5 per cent potassium oxide, 18 per cent barium oxide and having a batch composition including material of the group consisting of aluminum metal powder and silicon powder and mixtures thereof in an amount of about 0.03 per cent of the weight of the finished glass.

9. A glass of high transmission for radiation including the short ultraviolet and the long infrared wave lengths containing substantially 65% silica, 2% boric oxide, 5.5% sodium oxide, 9.5% potassium oxide, 18% barium oxide and aluminum in an amount of about 0.15% of the weight of the finished glass.

10. A low pressure mercury vapor ultraviolet electric discharge lamp designed for operation at a mercury vapor pressure of the order of 10 microns and an envelope temperature of approximately 47° C. whereby at least about 50% of the wattage input to the lamp is converted into radiations of 2537 Å. wave length and having a sealed envelope of soft glass having a coefficient of expansion in the neighborhood of 8 to $10 \times 10^{-6}$ and constituted substantially of 65 per cent silica, 2 per cent boric oxide, 5.5 per cent sodium oxide, 9.5 per cent potassium oxide, 18 per cent barium oxide, said glass having a batch composition including material of the group consisting of aluminum metal powder and silicon powder and mixtures thereof in a proportion of from 0.5 to 5 parts by weight to 4500 parts by weight of silica whereby said glass in a wall thickness of about 1 mm. has a transmission for 2537 Å. wave length radiation in excess of about 40%.

References Cited in the file of this patent

UNITED STATES PATENTS

| | | |
|---|---|---|
| 2,001,504 | Schmidt | May 14, 1935 |
| 2,010,836 | Adams | Aug. 13, 1935 |
| 2,056,930 | Navias | Oct. 6, 1936 |
| 2,445,012 | Van Orden | July 13, 1948 |
| 2,479,164 | Inman | Aug. 16, 1949 |